United States Patent [19]
Straub

[11] 3,877,733
[45] Apr. 15, 1975

[54] PIPE COUPLING

[76] Inventor: Immanuel Straub, c/o Straub Federnfabrik, 7323 Wangs, Switzerland

[22] Filed: June 10, 1974

[21] Appl. No.: 478,174

[30] Foreign Application Priority Data
June 15, 1973  Switzerland.......................... 8644/73

[52] U.S. Cl. ................. 285/105; 285/112; 285/373
[51] Int. Cl. ............................................. F16l 17/00
[58] Field of Search ........... 285/112, 111, 110, 105, 285/373, 419, 106, 104, 96, 102; 277/74, 79, 70, 71

[56] References Cited
UNITED STATES PATENTS

| | | | |
|---|---|---|---|
| 549,594 | 11/1895 | Cooper et al................... | 285/112 X |
| 1,867,891 | 7/1932 | Reynolds........................ | 285/112 X |
| 2,491,004 | 12/1949 | Graham.......................... | 285/112 X |
| 2,846,240 | 8/1958 | Beyer.............................. | 285/111 X |

*Primary Examiner*—Dave W. Arola
*Attorney, Agent, or Firm*—Werner W. Kleeman

[57] ABSTRACT

A pipe coupling with a sealing gasket enclosed in a housing intended to be applied about the pipe ends which are to be interconnected and having a substantially C-shaped cross-section with end edges constructed as sealing lips which are intended to sealingly bear against a respective one of the pipe ends. Each sealing lip is supported at the web of the sealing gasket by means of an annular or ring-shaped bead arranged at an axial spacing from the lip root or base, and wherein spaces to both sides of the ring-shaped bead are interconnected with one another by throughpassages.

8 Claims, 9 Drawing Figures

PATENTED APR 1 5 1975 3,877,733
SHEET 1 OF 2
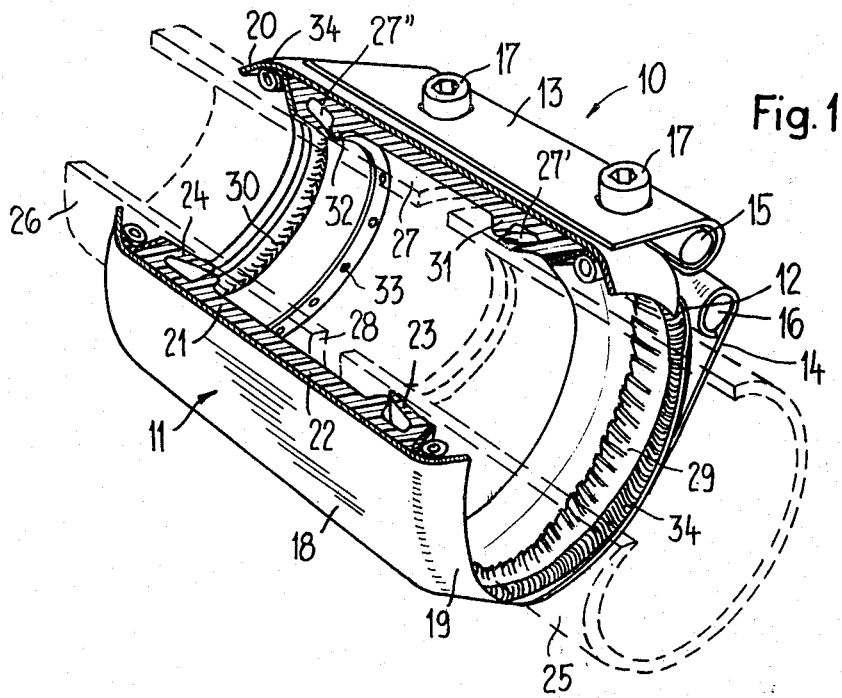
Fig. 1
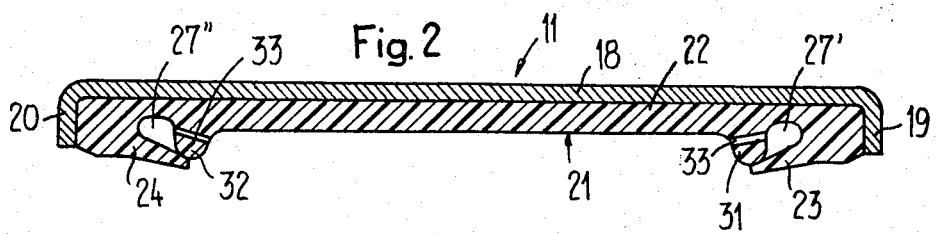
Fig. 2
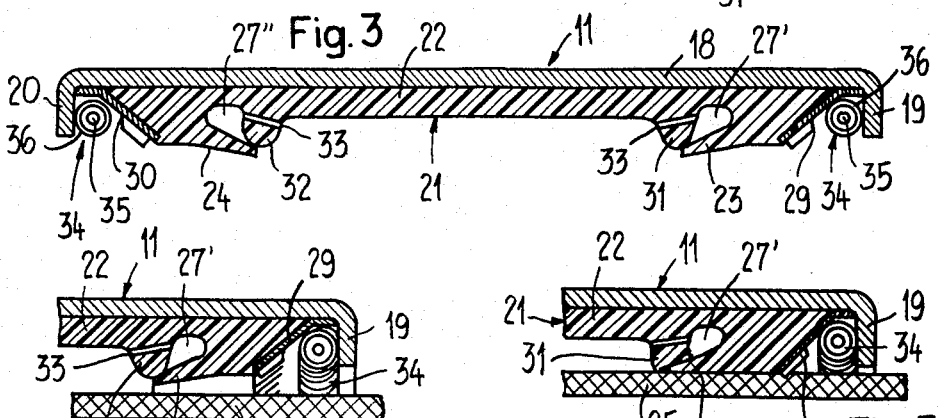
Fig. 3
Fig. 4    Fig. 5
Fig. 6

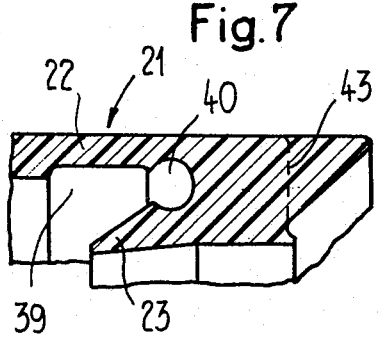
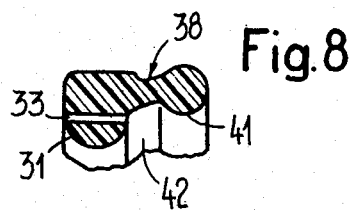
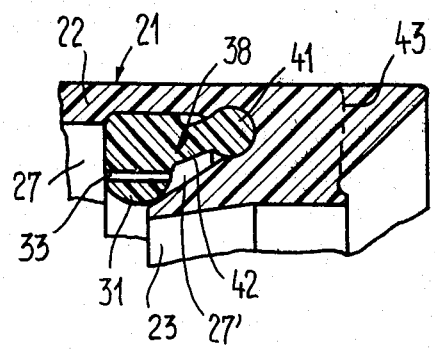

PIPE COUPLING

BACKGROUND OF THE INVENTION

The present invention relates to a new and improved construction of pipe coupling of the type equipped with a sealing gasket which is enclosed in a housing which can be clamped about the pipe ends which are to be interconnected and which gasket possesses a substantially C-shaped cross-section possessing end edges constructed as sealing lips which are intended to sealingly bear against a respective one of the pipe ends.

Such pipe couplings belong to that species where the sealing gasket of C-shaped cross-section configuration is open towards the diameter of the pipes or conduits which are to be interconnected, i.e., open towards the inside, since as mentioned, the sealing lips are intended to sealingly bear against the pipe ends.

Examples of prior art pipe couplings of this type are disclosed, for instance, among others in U.S. Pats. Nos. 2,259,453, 2,463,235, 2,491,004, 2,451,354, and 2,508,914, and in British Pat. No. 880,204 and German Patent Publication 2,248,361. With such pipe couplings the inside of the gasket is impinged by the medium which is guided through the pipes or conduits which are to be interconnected. In other words, this means that the sealing lips must be pressed that much more intensely against the outer diameter of the pipes to be interconnected the greater the over-pressure which prevails internally of the pipes. This is especially advantageous for the reason that the sealing of the pipe joint thus occurs so-to-speak automatically, in any event however independent of an external pressurized medium source, as such is the case for pipe couplings of a different species. With this lastmentioned species the sealing gasket is open towards the outside, i.e., towards the housing and bears with its web against the outer diameter of the pipes.

In any event it should be understood that along with the aforementioned advantages of the previously discussed pipe couplings there is also present the drawback that the sealing effect, when the pipes are not under pressure, is no longer or at best inadequately insured for, so that such couplings only are usable in those situations where there can be tolerated either a slight leakage during the pressureless state of the pipes and/or where measures are provided to insure that there is always present sufficient pressure in order to guarantee for a faultless sealing action.

The pipe couplings equipped with gaskets opening towards the outside — since impinged from a foreign source — of course are not associated with the drawback that the sealing effect is impaired with decreasing pressure within the pipes, but in this instance it is generally the web of the gasket which bridges the pipe joint. Therefore with this construction of coupling there are always present locations where the gasket does not bear flatly against the unimpinged side, with the result that the gasket is subjected at such locations to stark shearing forces, particularly when the material of the gasket and the pressurized medium impinging against the gasket expand owing to increases in temperature.

This phenomena again does not arise in the case of pipe couplings of the first-mentioned species because with such constructions there always remains open a throughpassage to the inside of the pipe by means of which there can occur a volume compensation.

From what has been discussed above it should be apparent that the heretofore known couplings of the one or the other species to a certain extent only constitute a compromise which is capable of satisfying certain requirements under the precondition that other requirements — which likewise can be just as important — are not satisfied.

Therefore in practice it is in fact the case that up to the present there has not been provided any coupling of the previously mentioned type which is capable of guaranteeing for a faultless sealing of the pipe joint independent of the pressure prevailing internally of the pipes.

SUMMARY OF THE INVENTION

Therefore, it is a primary object of the invention to provide an improved construction of pipe coupling which is not associated with the aforementioned drawbacks and limitations of the prior art proposals.

Another and more specific object of the present invention aims at the provision of a new and improved construction of pipe coupling wherein there is fulfilled the function of constructing the same in such a manner that the end edges of the sealing gasket, which end edges are constructed as sealing lips, even in the case when the pipes are not under pressure, but especially when the pipes are under pressure, sealingly bear against the outer diameter or surface of the pipes which need not be necessarily previously machined.

Now in order to implement these and still further objects of the invention, which become more readily apparent as the description proceeds, the proposed pipe coupling of the first mentioned type is manifested by the features that each sealing lip is supported at the web of the sealing gasket by means of an annular or ring-shaped bead arranged at an axial spacing from the lip root or base, and the spaces or chambers to both sides of the ring-shaped beads are connected with one another by throughpassages.

With this pipe coupling construction it is therefore not first the internal pressure of the pipes which causes the sealing lips to finally and sealingly bear against the outer diameter of the pipes, rather it is the ring-shaped or annular bead which — during clamping of the housing — forces the associated lip purely mechanically to bear against the corresponding pipe outer diameter. As soon as a pressure builds-up internally of the pipe, then — owing to the throughpassages at the bead — the entire side of the sealing lip which faces away from the pipe outer diameter is impinged and such in the first instance remains pressed against the pipe outer diameter owing to the uniformly acting pressure of the fluid medium.

The ring-shaped or annular bead can be formed at the sealing lip itself, advantageously however at the web of the gasket.

It is particularly advantageous if the ends of the sealing lips are supported at the inwardly directed apex or crown of the associated ring bead.

The throughpassages can be constructed in the form of a number of continuous transverse bores arranged at the region of the root or base of the annular bead.

In the event that the pipe coupling also should be capable of taking-up axial forces which occur during increasing internal pipe pressure and which forces have the tendency of forcing the pipe ends away from one another, then it is advantageous if the ends of the web of the sealing gasket are each supported upon a substantially truncated conical-shaped anchoring ring which converge in the direction of the longitudinal center of the housing, this anchoring ring bearing with its larger diameter upon stops formed by the housing. In this case there is prevented that the sealing lip will axially shift away from the annular bead under the action of the internal pipe pressure and at the same time the anchoring ring will be pressed axially somewhat flatter due to the contacting end of the web, something which only can occur while reducing its smaller diameter, which then imbeds more intensively into the outer diameter or surface of the associated pipe. Consequently, with increasing internal pressure there is provided a likewise increasing axial anchoring of the pipes against one another. With this constructional embodiment it is advantageous if the anchoring ring, starting from its small diameter, is radially lamellated, wherein successive lamellae of the anchoring ring can overlap one another in a shutter-like fashion. In this way the internal diameter of the anchoring ring is provided with a peripheral or outer contour possessing a toothed configuration favouring a clawing action into the outer diameter or surface of the associated pipe.

The annular or ring-shaped bead need not be formed at the gasket or the web thereof and moreover of the same material. It can be constructed as a profile ring, for instance, from a material possessing other elastic properties, and which is inserted at the inside of the web in each case opposite one of the sealing lips.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective cross-sectional cutaway view of a first exemplary embodiment of the invention;

FIG. 2 illustrates the lengthwise profile or section of a second exemplary embodiment;

FIG. 3 illustrates the lengthwise profile or section of an exemplary embodiment corresponding approximately to the showing of FIG. 1;

FIGS. 4, 5 and 6 illustrate a portion of the lengthwise profile or section of the exemplary embodiment of FIG. 3 in different operational positions;

FIG. 7 illustrates a portion of the profile or section of a gasket or packing sleeve with insertable annular or ring-shaped bead;

FIG. 8 illustrates the profile or sectional shape of a profile ring which can be inserted into the gasket of FIG. 7; and FIG. 9 illustrates the gasket in its assembled condition and composed of the part shown in FIG. 7 and the profile ring shown in FIG. 8.

DETAILED DESCRIPTION OF THE DRAWINGS

Describing now the drawings, the exemplary illustrated pipe or conduit coupling 10 depicted in FIG. 1 comprises an essentially tubular-shaped housing 11 which is slit lengthwise at location 12. Two clamping brackets 13, 14 are welded at the housing 11, the free end edges of which are flexed and enclose a respective clamping rod 15, 16 which, in turn, are interconnected by means of two clamping bolts 17. By tightening both of the clamping bolts 17 it is therefore possible to reduce the internal diameter of the entire housing 11 much in the manner of a hose clamp. In so doing the width of the gap 12, which is bridged or spanned by a not particularly illustrated sheet metal insert which is inserted between sleeve and housing, is reduced practically to null. By means of its housing body 18 and its inwardly flexed ends 19, 20 the housing 11 encloses a sealing gasket or packing sleeve 21 which, in the exemplary embodiment under discussion, is fabricated of one-piece from synthetic rubber. The gasket 21 possesses a substantially C-shaped cross-section in that at the web 22 of the gasket there is formed at both ends an inwardly directed sealing lip 23, 24 which extends from the ends towards the center of the web. With the broken or phantom lines there have been indicated in FIG. 1 the ends of two pipes or conduits 25 and 26 which are to be interconnected.

From what has been discussed above it should be apparent that with the pipes 25, and 26 introduced into the coupling 10 the gasket or packing sleeve 21 defines a compartment or chamber 27 which is closed towards the outside and which is in flow communication via the pipe joint 28 with the interior of the pipes 25, 26. This compartment 27 is thus capable of being impinged by the medium conducted through the pipes. The gasket 21 bears with the rear face of its web 22 flatly against the inside of the housing body 18 and with the ends of the web against a respective lamellated anchoring ring 29, 30 which, as best seen by referring to FIG. 3, essentially possessess the shape of a truncated cone. The anchoring rings, as already mentioned, are lamellated, and specifically through the provision of slots which extend radially away from the smaller diameter of the anchoring rings. The thus formed lamellae or tabs overlap, so that the anchoring rings 29, 30 essentially possess the shape of a truncated cone. The sealing lips, 23, 24 essentially tightly bear against the outer diameter of the pipes 25, 26. So that this is also the case even when the pipes 25, 26 are without pressure, a respective ring-shaped or annular bead 31, 32 is formed at the web 22 of the sealing gasket 21 opposite the ends of the sealing lips 23, 24, such beads preventing the sealing lips 23, 24 from raising by means of their free ends from the outer diameter or surface of the pipes 25, 26. By means of the beads 31, 32 there are separated from the ends of the jacket-shaped or shell-shaped compartment 27 two partial chambers or compartments 27' and 27'' respectively, which however are hydraulically connected with one another, and specifically by the provision of continuous or open-end bores 33 at the beads 31 and 32 respectively.

As best seen by referring to FIG. 3 the anchoring rings 29, 30 are supported at the region of their larger diameter at the inside of the housing body 18 at the region of the transition location of the flexed ends 19, 20 and fixedly clamped in position by means of an associated spring ring 34. The expandible spring or resilient ring 34 consists of a wire ring 35 wound by means of a helical spring 36 having tightly contacting coils or windings. This construction, namely the anchoring rings 29, 30 as well as the spring rings 34 ensures that the gasket or packing sleeve 21 will remain fixedly clamped within the housing 11 independent of the fact whether the clamping bolts or screws 17 are tightened or not. This construction also at the same time permits reducing the inner diameter of the housing by tightening the bolts 17, without there resulting any appreciable deformation of the anchoring rings or the gasket. This is especially the case for such pipe couplings, the wall thickness of which (wall thickness of the housing plus the wall thickness of the gasket 21) in relationship to the diameter of the pipes to be interconnected is very small.

Before considering the mode of operation of the illustrated pipe coupling reference will still first be made to FIG. 2 where there is illustrated the lengthwise profile or section through the wall of a pipe coupling, the function of which merely resides in sealingly interconnecting two pipe or conduit ends, however, not in taking-up axial forces which displace both pipe ends away from one another. There will be again recognized the housing 11 with housing body 18 at which merge the inwardly flexed ends 19, 20. The gasket or packing sleeve 21 bears with the ends of its web 22 directly at these ends 19, 20 and the sealing lips 23, 24 are supported with their free ends upon the ring beads 31, 32 at the web 22, these beads again possessing continuous or open-end bores 33.

Now if there is considered FIG. 4 then there will be recognized in the therein illustrated profile section the right-hand end of the pipe coupling illustrated in FIGS. 1 and 3 and a wall of the inserted pipe or conduit 25. The sealing lip 23 does not yet bear against the outer diameter or surface of the pipe 25 because the clamping or tightening bolts 17 have not yet been tightened. As soon as both pipe ends have been inserted into the coupling 10 and have approximately reached their final positions, then, the clamping bolts 17 are tightened and there is present the situation illustrated in FIG. 5. The inner diameter of the housing 11 has reduced and the play between the outer diameter of the pipe 25 and the ends of the housing 11 is practically reduced to null. Along with the housing 11 there is also reduced the inner diameter of the sealing gasket or packing sleeve 21, and thus the sealing lips 23 and 24, due to the action of the associated ring beads 31 and 32 respectively, are brought to tightly flatly bear against the outer diameter of the pipes 25 and 26 respectively. The anchoring rings 29, 30 arrive by means of their sharp edged inner diameter in engagement with the outer diameter of the pipes. The pipe connection is now tight, even if internally of the pipes 25, 26 there is not yet present any overpressure or there is even present a negative pressure.

As soon as however an overpressure prevails in the pipes then there results the situation which has been illustrated in an exaggerated manner, for purposes of explanation, in FIG. 6. The compartment 27 and owing to the bores 33 in the beads 31 and 32 respectively, also the partial compartments or chambers 27' and 27'' respectively, are impinged by the pressurized medium emanating from the interior of the pipes 25, 26. Consequently, the sealing lips 23 and 24 are deformed from the inside and are brought to still further flatly sealingly bear over their entire axial extent. At the same time the partial compartments or chambers 27' and 27'' enlarge, the ends of the web 22 of the sealing gasket 21 tend to axially displace the anchoring ring 29 and 30 respectively towards the outside, which however is only possible by reducing the smaller diameter of the truncated conical-shaped anchoring rings 29 and 30 respectively. As a result, the over-lapping lamellae of such spring or resilient rings claw, like a toothed arrangement, progressively into the outer diameter of the pipe 25 and completely seal towards the outside the space occupied by the sealing gasket 21 in the housing 11. The pressure internally of the pipes 25, 26 can now also increase beyond the flow boundaries of the material of the sealing gasket 21, it does not experience any further deformation because there is no through-passage present at all through which the sealing material could flow-away. Quite to the contrary, with increasing pressure the sealing action and at the same time also the axial anchoring of the pipes at one another is increased. As best seen by referring to FIG. 6, the sealing lips 23, 24 possibly can even lift-off of the apex or crown of the associated ring beads 31 and 32 respectively, something which is without any significance because the contact force, by means of which the sealing lips 23 and 24 are pressed against the outer diameter of the pipe, originates from the fluid medium pressure in the partial compartments 27' and 27'' respectively.

From what has been discussed above it should be apparent that the annular or ring-shaped beads 31 and 32 in the first instance serve the purpose of pressing the ends of the sealing lips 23 and 24 in the pressureless state of the pipes in a sealing manner against the inner diameter thereof. Therefore, the beads need not be formed of the same rubber material as the gasket. If there is employed for the gasket, for instance, a material which is highly resistant against the action of pressure, temperature and/or chemicals, but is rather "slack" or "lame" as concerns elasticity, then there can be provided for the beads 31 and 32 an especially pressure-elastic meterial. An exemplary embodiment of sealing gasket or packing sleeve 21, which, among other things, fulfills such condition, has been shown in FIGS. 7 to 9. Instead of the bead 31 this rubber gasket carries at the end region of its web 22 an inwardly open, flat annular or ring-shaped groove 39 at which merges an annular or ring-shaped compartment 40 of substantially circular-shaped cross-section. At the ring compartment 40 there merges the sealing lip 23. The bead 31 is part of a profile or section ring 38 which has been illustrated in FIG. 8. The profile or sectional shape of such ring 38 possesses a circular-shaped enlarged portion 41 which is connected through the agency of a thin-walled web 42 with the actual bead 31. As best seen by referring to FIG. 9, the enlarged or bulbous portion 41 exactly fits into the annular or ring-shaped compartment 40, so that the outer periphery of the profile ring 38 comes to bear in the groove 39. Between the web 42 and the sealing lip 23 the partial space or compartment 27' remains free, and which is flow connected via the bores 33 formed at the profile ring 38 and extending through the bead 31, with the jacket compartment 27 which is located at the inside of the web 22 of the sealing gasket.

The exemplary embodiment of sealing gasket illustrated in FIGS. 7 to 9 also possesses advantages from the standpoint of its manufacture in so far as it is readily possible to produce both components, namely the profile of FIG. 7 and the profile of FIG. 8, so as to already have a ring-shaped configuration in vulcanization molds. This is not readily possible for the profile of sealing gasket or packing sleeve 21 portrayed in FIGS. 1 to 6. For this profile shape it is recommended to initially extrude in a band-shaped manner the entire profile member (without bores 33), thereafter to cut such to predetermine length and to bend-up in a ring-shaped manner the sections and to butt vulcanize against one another the ends thereof. Therefore, in the case of smaller pipe diameters there is more readily chosen for the sealing gasket 21 the profile shape shown in FIGS. 7 to 9, whereas for larger pipe diameters there also can be used the profile shape depicted in FIGS. 1 to 6. By means of the phantom lines 43 in FIGS. 7 and 9 there is indicated that this embodiment of sealing gasket 21 also can be employed for pipe couplings of the type shown in FIG. 2, i.e., without lamellated anchoring rings 29, 30.

With the illustrated embodiments of pipe couplings it is possible to fabricate faultless pipe connections with respect to the sealing action and axial loading capability (FIGS. 1, 3–6), without having to place any particular requirements upon the pipe ends. In particular, the pipe ends do not require any preparatory machining, something which is of significance for instance in the case of plastic-coated pipes, glass fiber reinforced plastic pipes as well as also cast pipes and externally rusted pipes. Additionally, with respect to the outer diameter and/or deviations from the circular shape the pipe ends can accept considerably greater tolerances than posssible with conventional couplings. Finally, the illustrated coupling constructions also permit alignment deviations of the pipes which occur curing operation of both such interconnected pipes without the seal being impaired thereby.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A pipe coupling for coupling together the pipe ends of pipes, comprising a clampable housing capable of being clamped about the pipe ends intended to be interconnected, a sealing gasket enclosed in said housing and possessing a substantially C-shaped cross-section with end edges constructed as sealing lips and intended to sealingly bear against a respective one of the pipe ends, said sealing gasket having a web, each sealing lip having a lip root and being supported at the web of the sealing gasket by means of an associated substantially ring-shaped bead arranged at the web in axial spacing from the associated lip root, each sealing lip possessing a substantially tapered configuration decreasing in thickness and extending towards a free end of minimum thickness remote from its lip root, the associated substantially ring-shaped bead only bearing against said free end of minimum thickness of said sealing lip during such time as the clampable housing is not yet clamped, and wherein said sealing gasket is provided with spaces to each side of the ring-shaped bead which are connected with one another by throughpassages.

2. The pipe coupling as defined in claim 1, wherein said ring-shaped bead is formed of one piece with the web of the gasket.

3. The pipe coupling as defined in claim 1, wherein the free end of each sealing lip is supported at an inwardly directed crown of the associated ring-shaped bead.

4. The pipe coupling as defined in claim 2, wherein each ring-shaped bead possesses a number of open-end transverse bores at its base region, said transverse bores defining said throughpassages.

5. The pipe coupling as defined in claim 1, wherein the ends of the web of the sealing gasket are each supported at an associated substantially truncated conical-shape anchoring ring which converge towards the center of the housing, each anchoring ring bearing with its larger diameter upon stops formed at said housing.

6. The pipe coupling as defined in claim 5, wherein each anchoring ring, starting from its smaller diameter, is radially lamellated to form a successive arrangement of lamellae which overlap one another in a shutter-like fashion.

7. The pipe coupling as defined in claim 5, wherein each anchoring ring at the region of its larger diameter possesses a substantially cylindrical section, a resilient expandible ring engaging with the inside of said cylindrical section, said expandible ring fixedly clamping the anchoring ring at the inside of the housing.

8. The pipe coupling as defined in claim 1, wherein said each ring-shaped bead is formed by a profile ring member inserted at the inside of the web.

* * * * *